United States Patent [19]

Terashita et al.

[11] Patent Number: 5,369,463
[45] Date of Patent: Nov. 29, 1994

[54] APPARATUS FOR RECORDING POSITION INFORMATION OF PRINCIPAL IMAGE AND METHOD OF DETECTING PRINCIPAL IMAGE

[75] Inventors: Takaaki Terashita; Jin Murayama, both of Kanagawa, Japan

[73] Assignee: Fuji Photo Film Co., Ltd., Kanagawa, Japan

[21] Appl. No.: 76,172

[22] Filed: Jun. 14, 1993

Related U.S. Application Data

[63] Continuation of Ser. No. 804,434, Dec. 10, 1991, abandoned, which is a continuation of Ser. No. 515,897, Apr. 27, 1990, Pat. No. 5,128,711.

[30] Foreign Application Priority Data

| Apr. 28, 1989 | [JP] | Japan | 1-111086 |
| Jul. 31, 1989 | [JP] | Japan | 1-198867 |
| Sep. 7, 1989 | [JP] | Japan | 1-232487 |

[51] Int. Cl.5 .................................................. G03B 27/80
[52] U.S. Cl. .......................................... 355/38; 355/41
[58] Field of Search ................................ 355/38, 40, 41

[56] References Cited

U.S. PATENT DOCUMENTS

| 4,769,695 | 9/1988 | Terashita | 355/38 |
| 4,816,874 | 3/1989 | Terashita et al. | 355/38 |
| 4,912,495 | 3/1990 | Ishikawa et al. | 354/402 |
| 4,962,400 | 10/1990 | Otani et al. | 354/403 |
| 4,977,419 | 12/1990 | Wash et al. | 354/106 |
| 5,128,711 | 7/1992 | Terashita et al. | 355/41 |

Primary Examiner—W. B. Perkey
Attorney, Agent, or Firm—Sughrue, Mion, Zinn, Macpeak & Seas

[57] ABSTRACT

In recording an image on a recording medium such as photographic film, position information used for the detection of a principal image is recorded on the recording medium. The position information is read when a hard copy of the image is produced. A characteristic value is derived from within the area of the principal image detected in accordance with the position information. A print exposure amount used for producing a hard copy is determined in accordance with the characteristic value. The position information may be the information directly or indirectly representing the position of the primary image. The indirect representation may be a combination of a subject distance and a focal length of a taking lens. This combination determines a reference size of a face or figure image on a frame. By detecting an image having the same size as the reference size, the principal image such as a facial image or a figure image can be identified.

3 Claims, 18 Drawing Sheets

F I G. 18
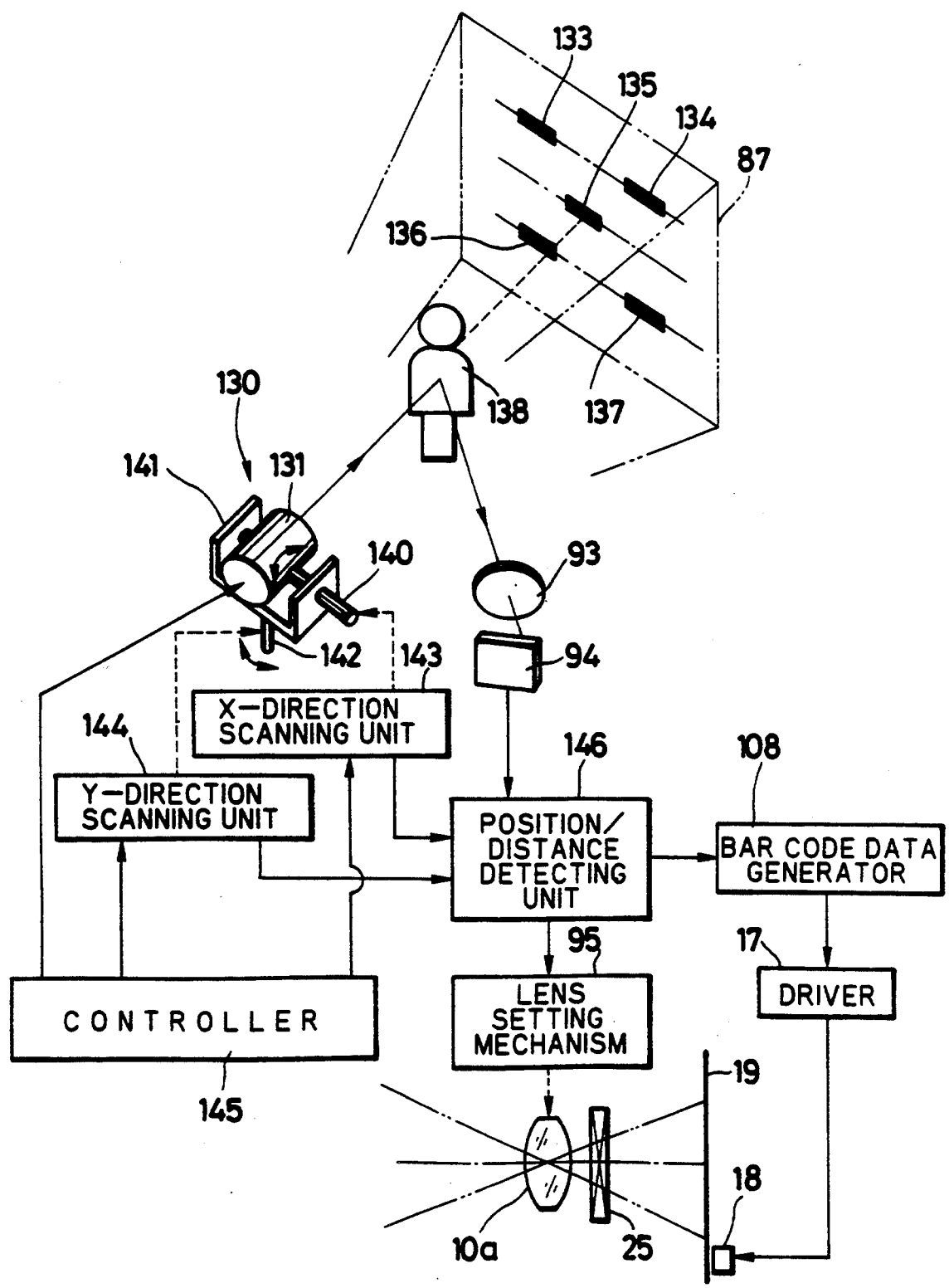

F I G. 22
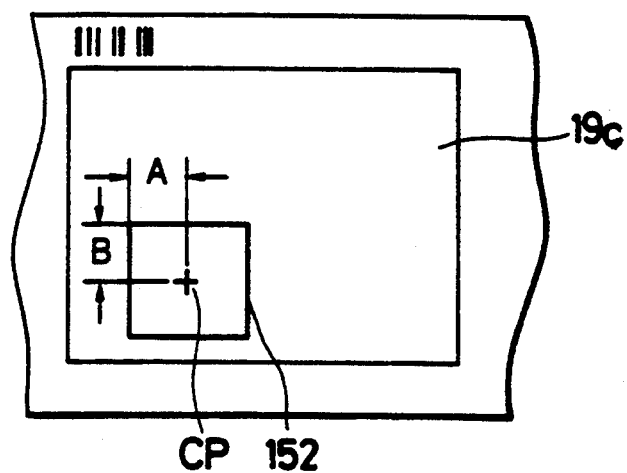
F I G. 23
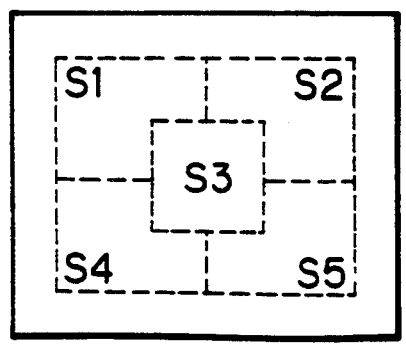

APPARATUS FOR RECORDING POSITION INFORMATION OF PRINCIPAL IMAGE AND METHOD OF DETECTING PRINCIPAL IMAGE

This is a continuation of application Ser. No. 07/804,434 filed Dec. 10, 1991, now abandoned, which is a continuation of application Ser. No. 07/515,897 filed Apr. 27, 1990, (now U.S. Pat. No. 5,128,711).

BACKGROUND OF THE INVENTION

The present invention relates to an apparatus for recording position information of a principal image and to a method of detecting a principal image. More particularly, the invention relates to an apparatus for recording information representing the position of a principal image within a frame at the time of taking an image, and to a method of identifying a principal image in accordance with that position information when a hard copy of the frame is produced.

Known recording media for recording an image include: photographic film used with a photographic camera; a magnetic recording medium used with a video camera and electronic still camera; an IC memory card; and the like. In producing a hard copy, a photographic film generally is used as the recording medium. In one current photographic print system, the photographing conditions and intent of a photographer are estimated from an image recorded on a photographic film, so that a finished photographic print in some cases may become unsatisfactory for the photographer.

Various types of known photographic cameras can record various information on a photographic film at the time of photographing in order to produce a photographic print matching the intent of a photographer. For example, Japanese Patent Laid-open Publication Nos. 51-117632, 52-13333, and 52-30429 describe the recording of illumination light type at the time of photographing on a photographic film. Japanese Patent Laid-open Publication Nos. 63-298233 and 64-21432 describe recording of trimming information. Japanese Patent Laid-open Publications Nos. 50-30517, 55-101932, and 54-2115 describe recording of the type of a principal image, i.e., the image of a principal subject (object).

It is common that photographic prints are regarded as properly finished if a principal image on a color paper has a proper density and color balance regardless of whether a background image is finished improperly to some degree. The above-described conventional methods, however, are associated with a problem in that a finished principal image cannot be properly formed because the position of a principal image cannot be identified. One method of discriminating a principal image is a statistical scheme to estimate that a principal image is present in the center of a frame. However, a principal image is not always present at the center of a frame, thereby posing a problem of a number of erroneous estimations.

Another method is to derive an image of a face from a frame on the empirical assumption that almost all principal images are human faces. For example, Japanese Patent Laid-open Publication No. 52-156624 describes a method wherein the color on a negative image corresponding to flesh color on a positive image (hereinafter, for ease of description, such color will be called simply flesh color) is defined, and the color density at each scanned point within a frame is compared with the defined color to judge whether the pixel is flesh colored. An area having such flesh colored pixels is considered to be a principal image. An average color density within the principal image area is calculated to determine a print exposure amount.

The just-described method is excellent from the standpoint of exposure control, but is not conducive to deriving flesh color pixels from within a frame. Therefore, for example, if a wall having a color similar to flesh color is included within a scene, this wall will be judged erroneously as flesh or skin.

According to a further method disclosed in Japanese Patent Laid-open Publication No. 62-189456, a frame is taken with a TV camera, and the image within the frame is displayed on a monitor to designate a point on a facial image with a light pen or the like. Using the color at the designated point as a reference, pixels having the same or approximately the same color as the reference color are derived automatically, so that the area having such derived pixels is determined to be a facial image area. However, with this method, cumbersome operations are required to designate a point of a facial image with a light pen.

SUMMARY OF THE INVENTION

In view of the foregoing, it is a principal object of the present invention to provide a method and apparatus capable of identifying a principal image within a frame correctly and easily.

It is another object of the invention to provide a method and apparatus capable of identifying a principal image correctly and easily when a hard copy is produced, by recording position information of the principal image on a recording medium when taking an image.

It is a further object of the invention to provide a method and apparatus capable of detecting a facial image correctly as a principal image.

The foregoing and other objects and advantages of the invention are achieved by the provision of apparatus for detecting the position of a principal subject image within a frame at the time of the range finding operation with a range finding device, and for recording position information representative of the position within the frame on a recording medium. The position information represents the position of the principal image within the frame. X- and Y-coordinate values, a code, or number for each divisional area of a frame divided in a matrix form, or a mark recorded on a recording medium at a position linearly extrapolated from a principal image may be recorded as position information.

Since the position of a principal image within a frame is detected at the time of the range finding operation for that frame, the position information of the principal image can be recorded on a recording medium without requiring a difficult operation.

According to a preferred embodiment of the invention, focal length data of a taking lens and subject distance data are recorded on a recording medium when taking an image. In producing a hard copy, the data are read to determine a reference size of a facial image as a principal image. The reference size is compared with the size of an area presumed to be a facial image within a frame, to judge whether the area is a facial image. With this embodiment, the area of a facial image can be detected correctly without requiring a difficult operation.

According to another embodiment of the invention, information of one of a plurality of range finding areas having a principal subject is recorded on a recording medium, such as a photographic film, when taking an image. In producing a photographic print, the range finding area information recorded for each frame is read, and the range determined mainly in accordance with the read range finding area is considered to be the principal image area. Image information within the principal image area is used for exposure control.

Bar codes, mark codes, characters, and the like may be used as the range finding area information. Two marks may be recorded near the sides of a frame such that the intersection of two orthogonal lines extending from the two marks indicates the range finding area. The distance information of a principal subject may be recorded together with the range finding area information.

BRIEF DESCRIPTION OF THE DRAWINGS

The foregoing and other objects and advantages of the invention will become apparent from the following detailed description when read in connection with the accompanying drawings, in which:

FIG. 18 is a schematic diagram showing an embodiment of a photographic camera which performs the range finding operation by scanning with a spot light two-dimensionally;

FIG. 22 is a diagram illustrating the size of a principal image;

FIG. 23 is a diagram illustrating divisional areas of a frame: and

FIGS. 24A and 24B to 26A and 26B are diagrams illustrating the relationships between the recorded position of a principal image and the principal image area.

DETAILED DESCRIPTION OF THE PREFERRED EMBODIMENTS

Figure 1:
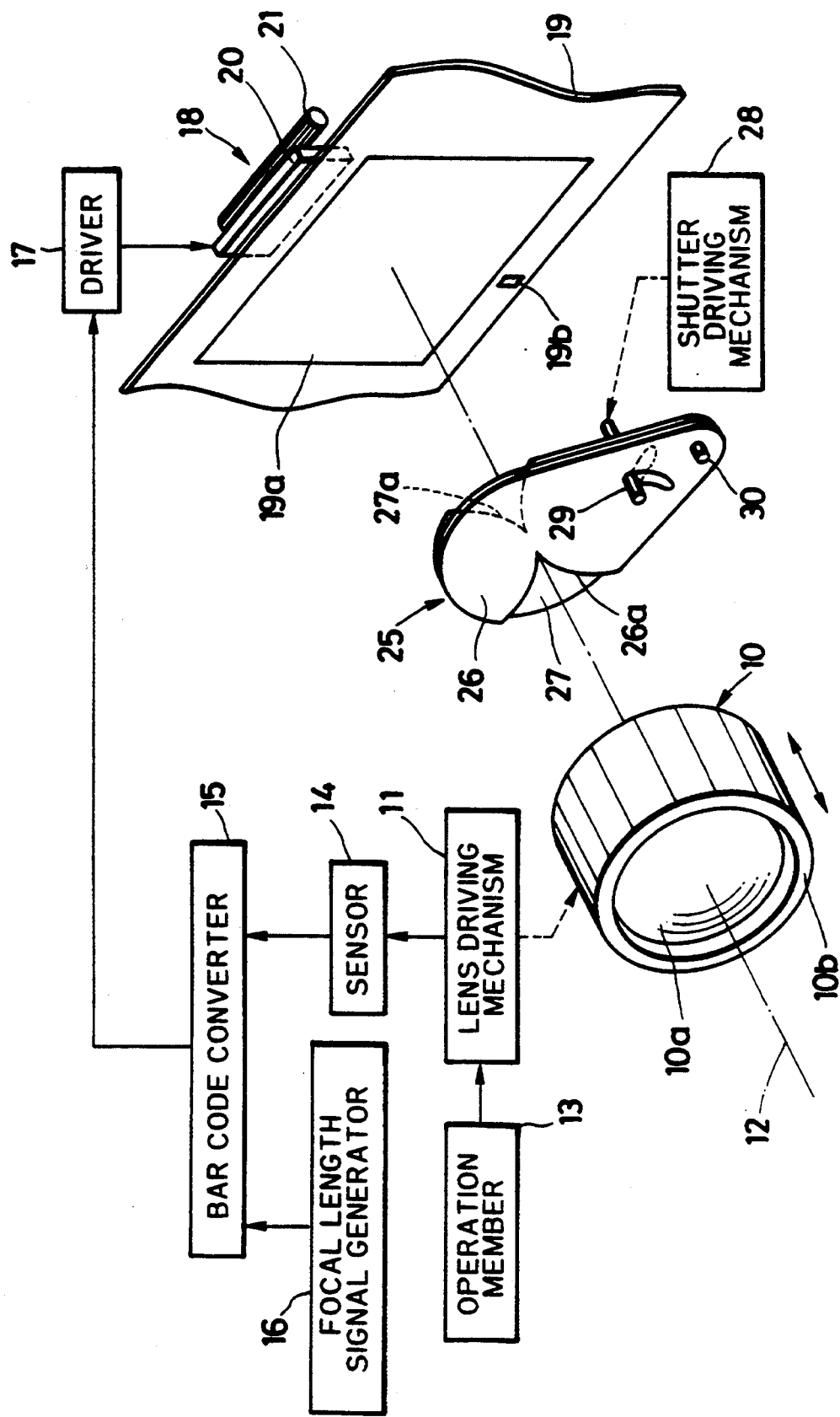
FIG. 1 is a schematic diagram showing an example of a photographic camera for recording the focal length of a taking lens and the subject distance.

Referring to FIG. 1, taking lens 10 is constructed of an optical system 10a and a lens barrel 10b for holding the optical system 10a. The taking lens 10 is moved along the optical axis 12 by means of a lens driving mechanism 11 which is driven by an operation member 13 in cooperative association with, e.g., a range finder. The lens driving mechanism 11 also activates a sensor 14, such as a potentiometer, to convert the degree of motion (the linear displacement or the degree of rotation) of the taking lens 10 into an electric signal which is sent to a bar code converter 15. The sensor 14 may detect the position of the operation member 13 or taking lens 10 by other means as well.

In addition to the sensor 14 which detects the degree of linear motion of the taking lens 10, a sensor of another type may be used, which generates a different range signal for each range of a plurality of ranges for possible motion of the taking lens 10.

A focal length signal generator 16 generates a signal representative of the focal length of the taking lens 10, and sends it to the bar code converter 15 which then puts corresponding bar code data in a driver 17. The driver 17 drives a bar code recording head 18 which records the distance information of a principal subject and the focal length data in bar code form on a photographic film 19. In this embodiment, the bar code recording head 18 is constructed of a liquid crystal display 20 for displaying a bar code, and a flash tube 21 for applying a flash to the displayed bar code. The distance information of a principal subject and the focal length data are recorded in the area between the frame 19a and the film edge at the same time as, or slightly before or after the subject is photographed.

In this embodiment, although a bar code is recorded while the photographic film 19 remains still, it may be recorded in synchronism with the feeding of the photographic film 19. In this case, only one bar is necessary for the bar code recording head 18 to record a bar code, thus simplifying the structure thereof. A mark or character may be recorded, instead of a bar code.

A shutter 25 is disposed at the back of the taking lens 10. This shutter 25 is constructed of, e.g., two shutter blades 26 and 27, having respective recesses 26a and 27a formed therein. The shutter blades 26 and 27 are moved by a shutter driving mechanism 28 such that they are pivoted in opposite directions about a fixed pin 30, while a movable pin 29 is moved toward the fixed pin 30, thereby making an aperture where the recesses 26a and 27a are superposed one upon another. A light passed through this aperture becomes incident on the photographic film 19 to photograph the subject.

Figure 2:
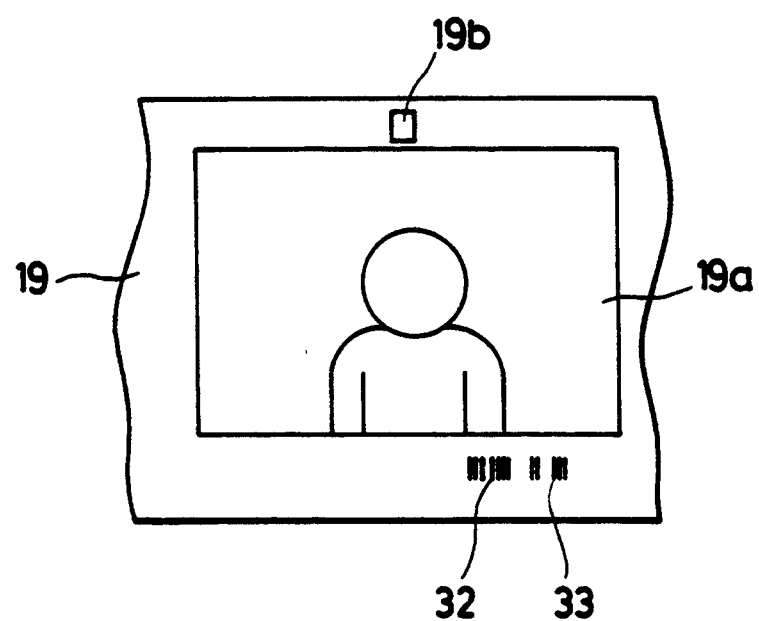
FIG. 2 shows an example of a photographic film recorded with a subject image taken with the photographic camera shown in FIG. 1.

FIG. 2 shows an example of a photographic film with bar codes recorded thereon. This photographic film 19 is formed, at regular intervals, with perforations 19b which are detected by a sensor of a feed stop device (not shown) to control feeding of the film one frame at a time. Distance information 32 of a subject and focal length data 33, represented by respective bar codes, are recorded on the side opposite each perforation 19b. The bar codes are made visible by a development process.

Figure 3:
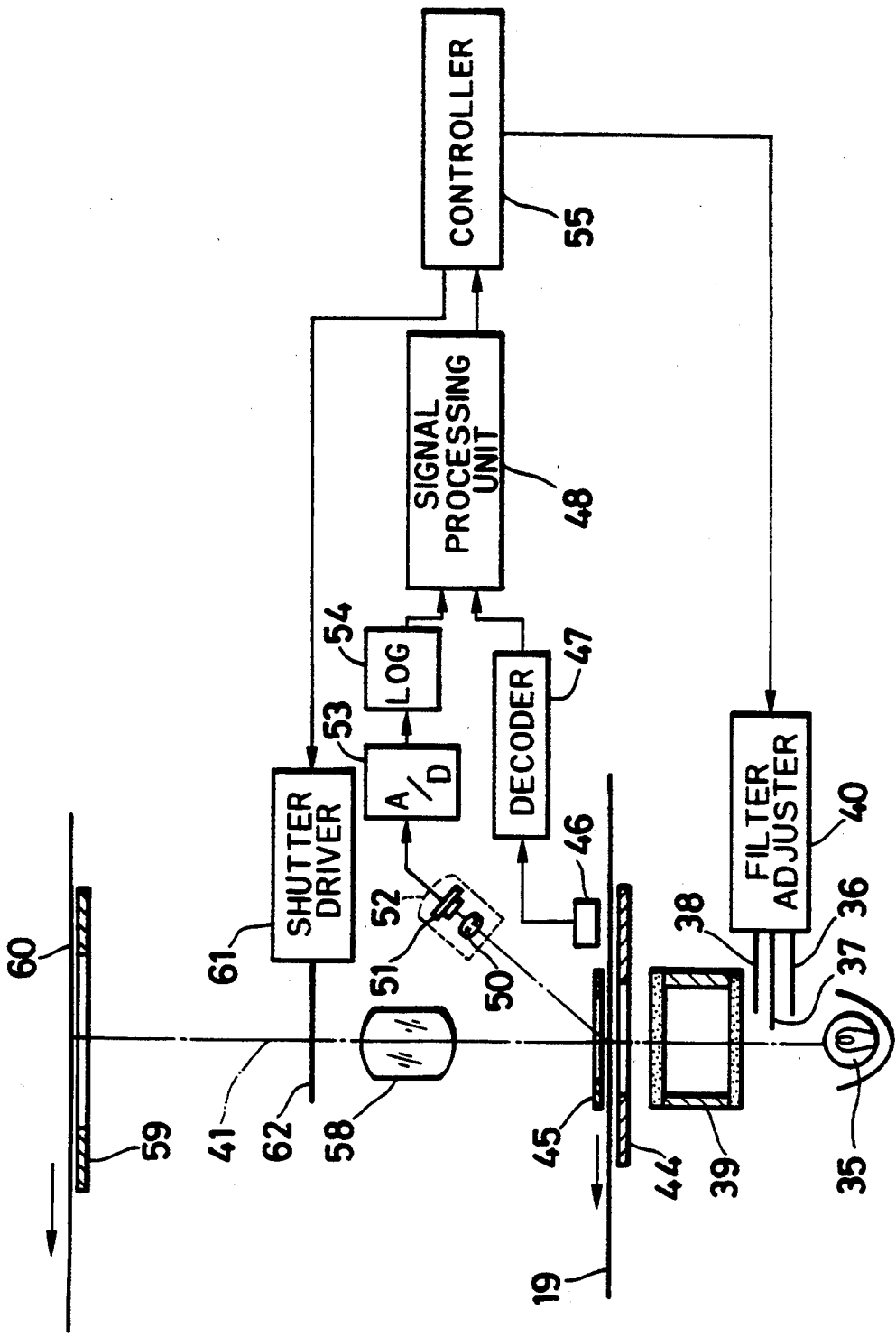
FIG. 3 is a schematic diagram showing an example of a photographic printer for making a print by using a developed photographic film.

FIG. 3 illustrates a photographic printer, in which white light radiated from a light source 35 passes through a cyan filter 36, a magenta filter 37, and a yellow filter 38 and enters a mixing box 39. The insertion degree of these color filters 36 to 38 into an optical path 41 is controlled by a filter adjuster 40 to regulate the three color components and intensities of a printing light. The mixing box 39 is constructed of a rectangular tube having an inner mirror surface and diffusion plates mounted on both opposite ends of the rectangular tube.

A film carrier 44 is set at the printing station. A developed photographic film 19 also is set at the printing station, and is illuminated by light transmitted through the mixing box 39. A film mask 45 is mounted at the printing station to ensure the flatness of the photographic film 19. This mask 45 is formed with an opening corresponding to the size of a frame, as is well known in the art. The film mask 45 is raised by a solenoid (not shown) while the photographic film 19 is being fed, and is lowered to press the photographic film 19 during the printing operation.

A bar code reader 46 is mounted at the upstream portion of the printing station to read the subject distance information 32 and focal length data 33 recorded for the frame while the photographic film 19 is fed to the printing station. The read data are decoded by a decoder 47, and are sent to a signal processing unit 48.

A scanner 52 is disposed upstream from and above the printing station. The scanner 52 is constructed of a lens 50 and an image area sensor 51, and measures the amount of light transmitted through each measurement point of the frame set at the printing station. A signal from the scanner 52 is converted by an analog to digital (A/D) converter 53 into a digital signal which then is converted by a logarithmic converter 54 into a density (strictly speaking, a logarithmically converted value corresponding to the density).

The density signal from the logarithmic converter 54 is sent to the signal processing unit 48 which derives an image of a face, selects a print exposure amount calculation equation in accordance with a presence/absence of the facial image, and calculates a print exposure amount by using the selected calculation equation. The obtained print exposure amount for each color is sent to a controller 55.

A printing lens 58, disposed above the printing station, enlarges and projects an image in a specified frame to a color paper 60 positioned at the back of a paper mask 59. A shutter 62, whose open/close operation is controlled by a shutter driver 61, is disposed between the printing lens 58 and color paper 60.

Figure 4:
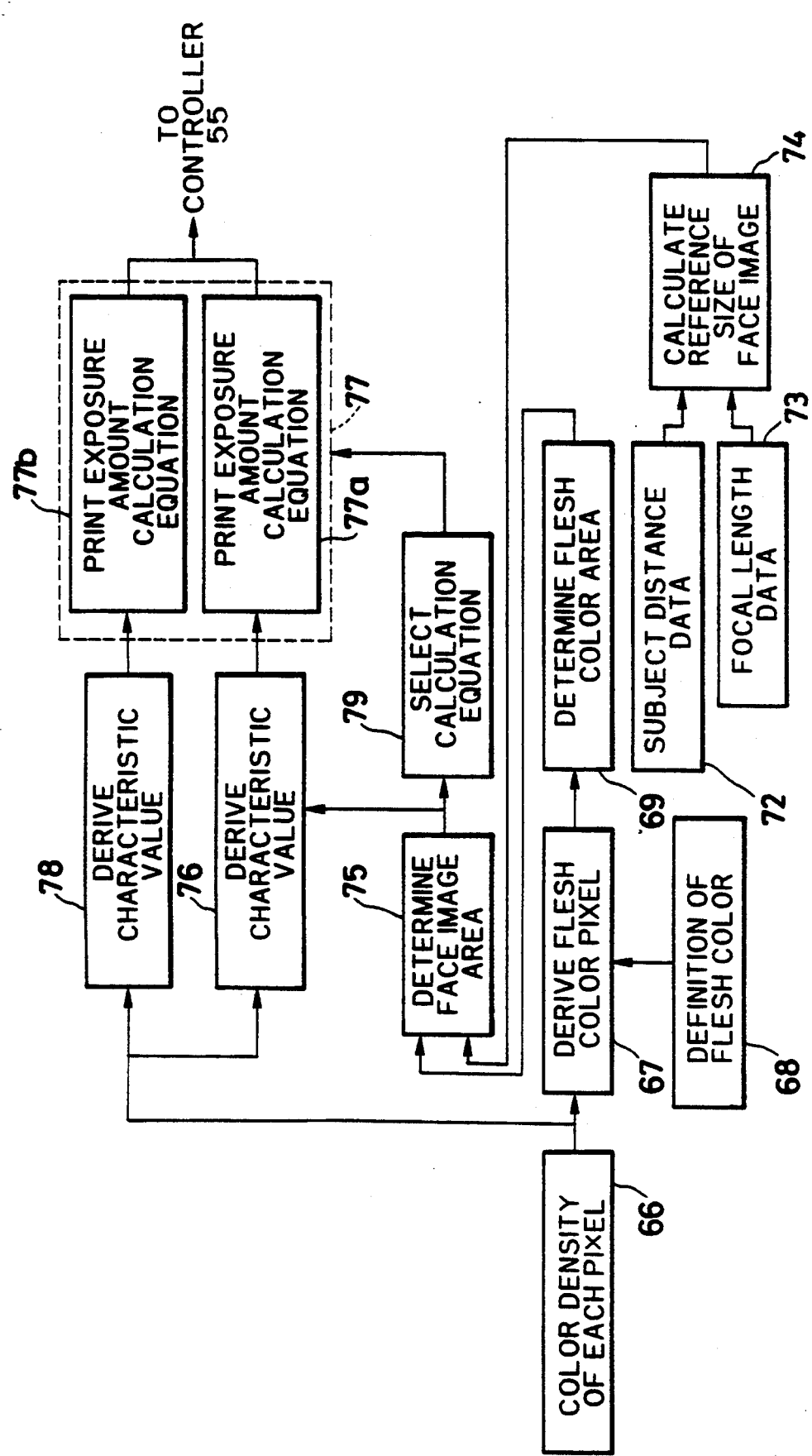
FIG. 4 is a functional block diagram illustrating the signal processing unit shown in FIG. 3.
Figure 5:
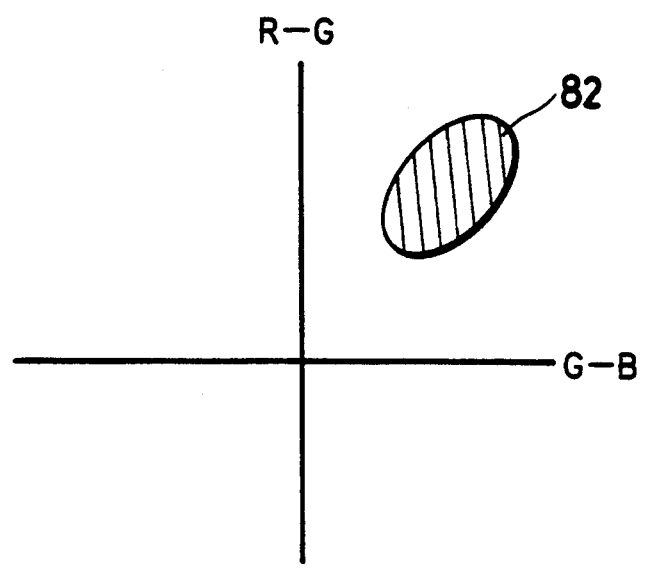
FIG. 5 is a graph defining the area of flesh color.

FIG. 4 illustrates the function of the signal processing unit 48, which is constructed of a microcomputer. A memory 66 stores therein three color densities (red color density R, green color density G, and blue color density B) for respective measurement points within the frame. The three color densities are sent to a flesh color pixel deriving unit 67 for the calculation of a print exposure amount. The flesh color pixel deriving unit 67 derives flesh color pixels. In deriving flesh color pixels, reference is made to a flesh color definition stored in a memory 68. A flesh color is defined, for example, by an elliptically-shaped region 82, indicated by hatch lines in FIG. 5, within a rectangular coordinate system having density differences (R−G) and (G−B) as its axes. A pixel whose density differences are coordinates included within the region 82 is judged to be a flesh colored pixel. A rectangle, rhombus or other shape may be used in place of an ellipse.

The position data of the pixel judged as a flesh color pixel are sent to a flesh color area determining unit 69 which determines a closed area constructed of flesh color pixels to be a flesh color area, and thereafter calculates the size of the flesh color area. This size may be represented by the longest of the straight lines interconnecting two points on the contour of the flesh color area. However, it is preferable to use area dimensions as the size for simplicity of calculation. The area dimensions may be represented by the number of pixels.

A memory 72 stores therein subject distance data, whereas memory 73 stores therein focal length data of the taking lens 10. Using these data, an operation unit 74 calculates the reference size FS of a facial image of a figure recorded in the photographic film 19 in accordance with the following equation:

$$FS = FS_0 \cdot f/(L-f)$$

where $FS_0$ is an ordinary size of faces in a figure, L is a subject distance, and f is a focal length.

A judgement unit 75 compares the calculated facial image reference size FS with the size of the derived flesh color area. If the size is the same, or approximately the same as the reference size FS, the flesh color area is judged to be a facial image. The coordinate values of the position of the facial image are sent to a characteristic value deriving unit 76 to derive characteristic values used for a calculation equation which determines a print exposure amount by emphasizing a finished facial image. In particular, the characteristic value deriving unit 76 reads from the memory 66 the color densities of facial image pixels and obtains an average value of these color densities. The characteristic value deriving unit 76 also calculates the maximum value and minimum value of pixels within the frame, an average density of a particular area such a central area and peripheral area of a frame, and other characteristic values.

The obtained characteristic values are sent to an operation unit 77 and are substituted into a print exposure amount calculation equation section 77a which emphasizes a flesh color. Another characteristic value deriving unit 78 derives characteristic values which are used with a general print exposure amount calculation equation section 77b. Particular examples of these print exposure calculation equations are detailed, e.g., in U.S. Pat. No. 4,769,695 issued Sep. 6, 1988 ( corresponding to Japanese Patent Laid-open Publication No. 62-189456). A calculation equation selecting unit 79 selects the print exposure amount calculation equation 77a if a facial image is present within the frame 19a, and selects the equation 77b otherwise. The print exposure amount calculated using the selected equation is sent to the controller 55.

The operation of the just-described embodiment now will be discussed. In taking a photograph, a camera is pointed at a principal subject, and a desired layout is determined. Thereafter, the operation member 13 is actuated in accordance with the distance from the principal subject. Upon actuation of the operation member 13, the taking lens 10 is moved along the optical axis 12 by means of the lens driving mechanism 11, and the focal point of the lens is adjusted. After such focal point adjustment, the sensor 14 detects the position of the taking lens 10 and sends a detected signal to the bar code converter 15.

The focal length signal generator 16 sends a focal length signal for the taking lens 10 to the bar code converter 15. Upon depression of a release button after focal adjustment, the shutter driving mechanism 28 moves the drive pin 29 reciprocally so that the shutter 25 opens and closes to photograph a subject.

Simultaneously with or slightly before or after this photographing, the bar code converter 15 converts the subject distance and focal length into bar codes which then are sent to the driver 17. The driver 17 drives the bar code recording head 18 to display the bar codes of the subject distance and focal length on the liquid crystal display 20. After the bar code display has become stable, the flash tube 21 is illuminated to record the subject distance data 32 and focal length data 33 in a peripheral portion of the frame 19a, as shown in FIG. 2.

After all frames of the photographic film 19 are used, the film is removed from the photographic camera and sent to a laboratory. At the laboratory, the film 19 is developed to make visible both a subject image and data recorded in each frame as latent images. The developed photographic film 19 is mounted on the film carrier 44 of the photographic printer shown in FIG. 3.

Figure 6:
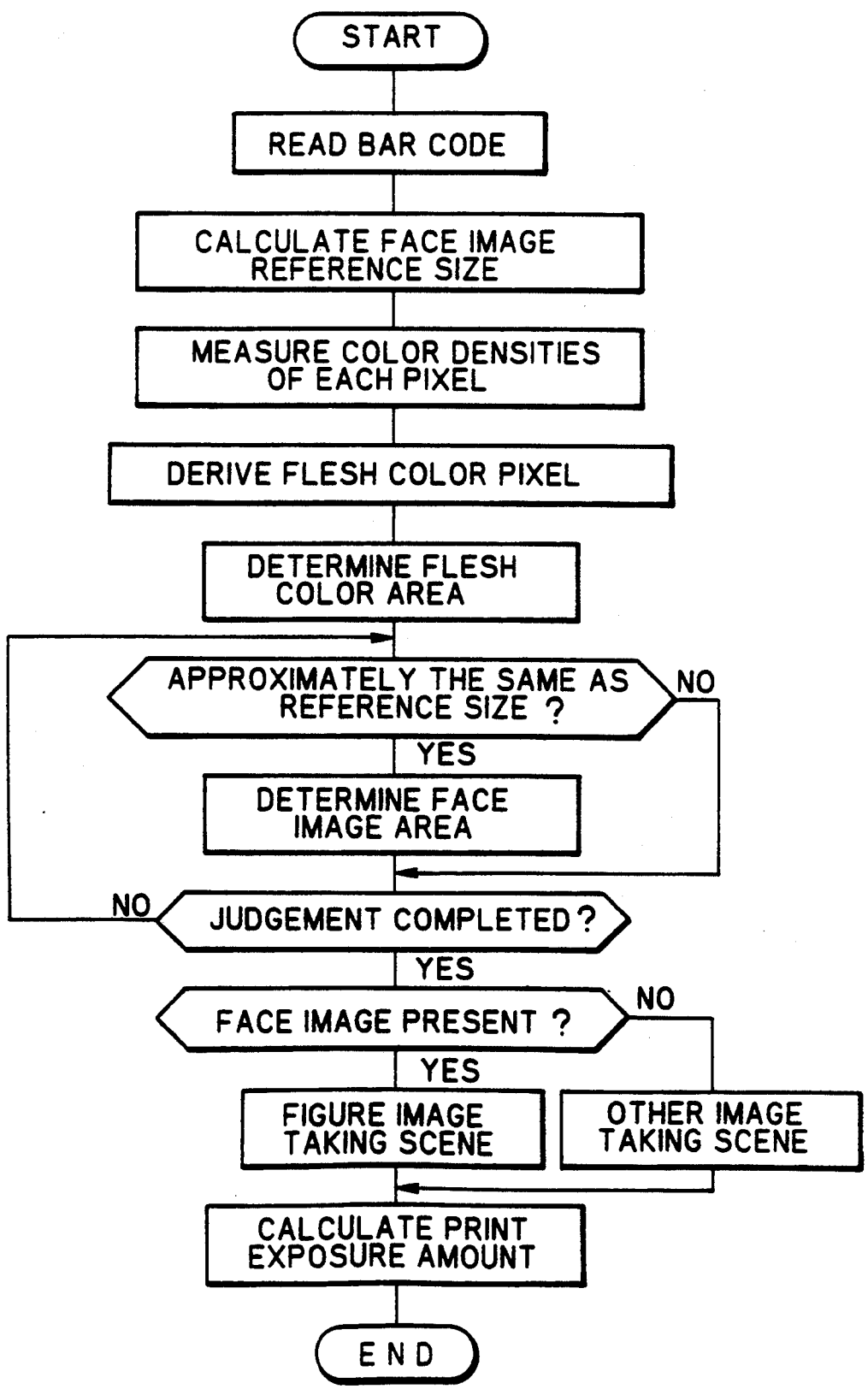
FIGS. 6 and 7 are flow charts showing a procedure for discriminating a face image.

While the photographic film 19 is fed on the film carrier 44, the subject distance data 32 and focal length data 33 recorded in the peripheral portion of the frame 19a are read with a bar code reader 46, as indicated in the flow chart of FIG. 6. The read data 32, 33 are decoded by the decoder 47, and are sent to the signal processing unit 48 which calculates, on the basis of the received data, the reference size FS of the facial image on the photographic film 19.

When the frame 19a is set at the printing station, the scanner 52 measures the transmitted red, green and blue light amounts for each measurement point within the frame 19a. The three color photometric values undergo A/D conversion and logarithmic conversion, and then are sent to the signal processing unit 48. After the photometry of respective pixels, the signal processing unit 48 derives flesh color pixels and determines the flesh color area which is composed of flesh color pixels. The flesh color area is compared with the reference size FS. If the flesh color area is the same or approximately the same as the reference size, the flesh color area is judged to be a facial image.

After completion of judging all flesh color areas, scene discrimination is carried out. In scene discrimination, if a facial image is present, the frame is discriminated as a figure photographic scene; otherwise the frame is discriminated as other photographic scenes. For the figure photographic scene, the characteristic values derived by the characteristic value deriving unit 76 are substituted into the print exposure amount calculation equation 77a to calculate a print exposure amount. For other photographic scenes, the characteristic values derived by the characteristic value deriving unit 78 are substituted into the print exposure amount calculation equation 77b to calculate a print exposure amount. After calculation of a print exposure amount, the controller 55 adjusts the insertion degree of the color correction filters 36 to 38 into the optical path 41 in accordance therewith. After adjusting the filters 36 to 38, the shutter 62 is opened for a predetermined time to print the frame 19a on the color paper 60. The other frames are printed sequentially in a similar manner.

Figure 7:
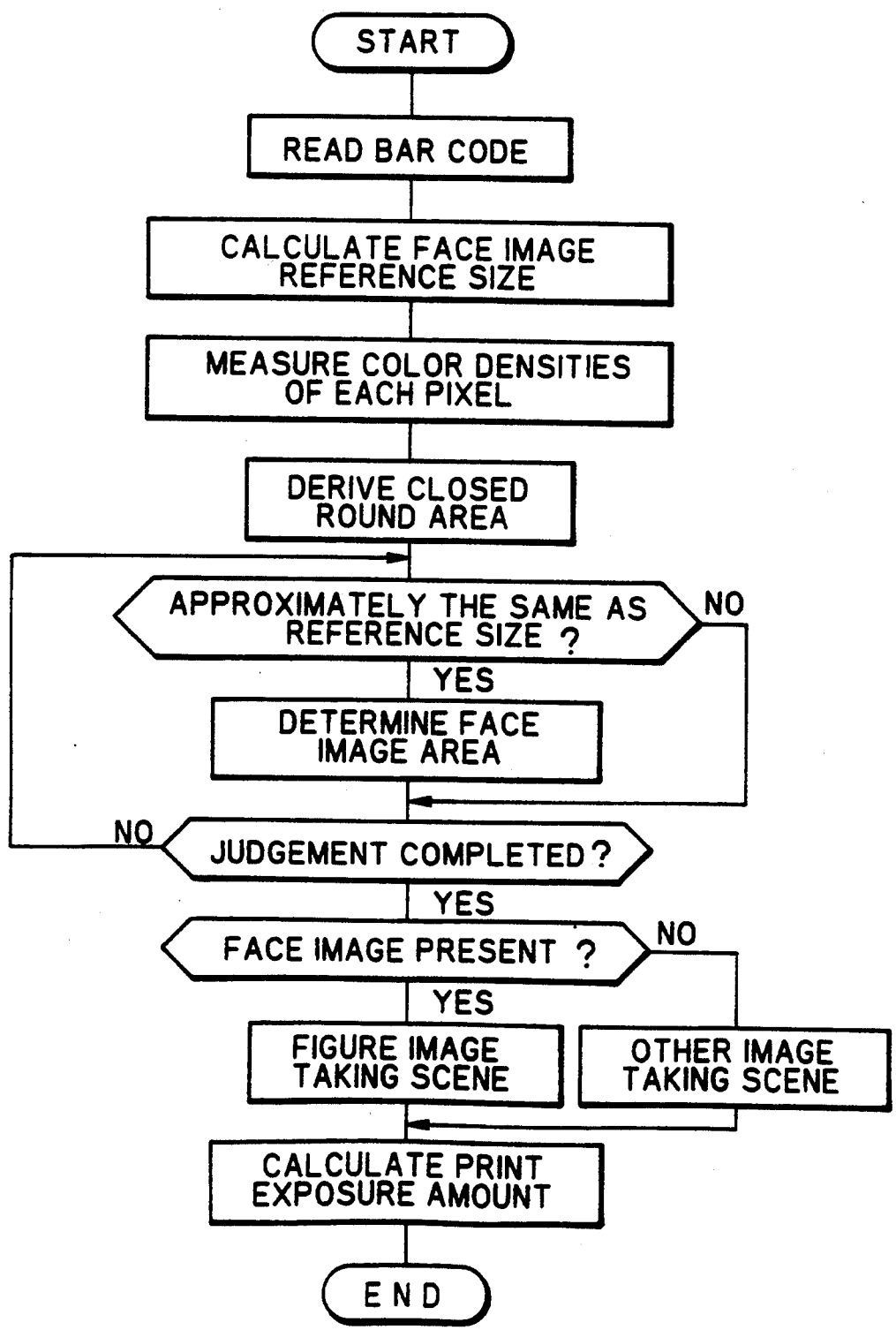

FIG. 7 is a flow chart showing another technique for discriminating a facial image. In this embodiment, a closed round contour is derived from images within a frame. Next, the round area size is compared with the reference size FS. If the round area size is the same or approximately the same as the reference size, the area is discriminated as a facial image.

Patterns of facial images relative to subject distances may be stored in a memory from which a facial image pattern is selected in accordance with subject distance data. By means of a pattern matching scheme, a pattern in the frame which is the same or approximately the same as the selected facial image pattern is discriminated as a facial image. In this case, since a facial image pattern changes with the direction of the face toward a camera, it is preferable to store several facial image patterns, in various attitudes, for respective subject distances in a memory.

Figure 8:
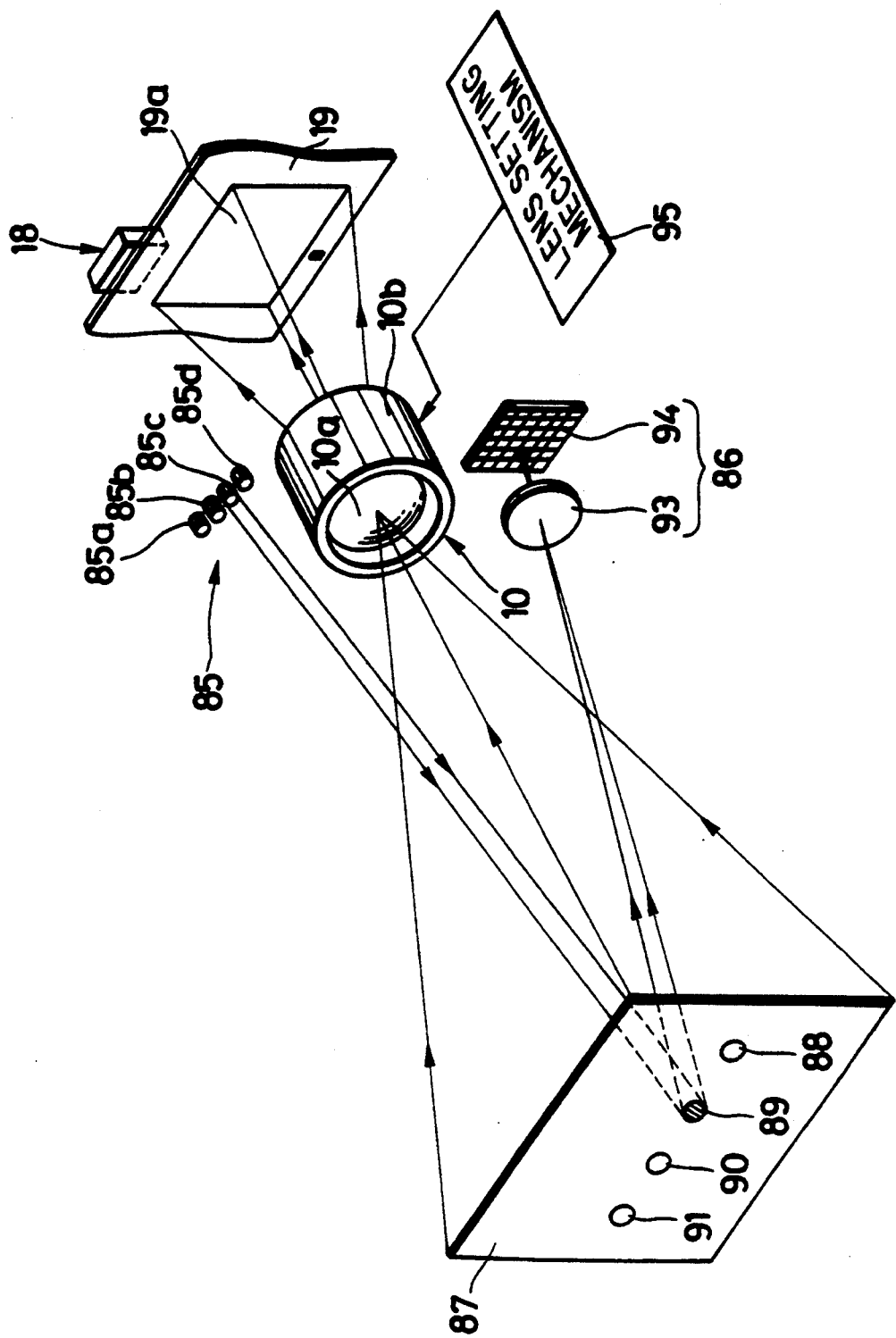
FIG. 8 is a schematic diagram showing a photographic camera for detecting the position of a principal subject during the range finding operation, and recording the position information on a photographic film.

FIG. 8 shows a photographic camera, having an automatic focussing device, which detects the position of a principal subject image on a frame during the range finding operation. In FIG. 8, elements which are the same as those shown in FIG. 1 are represented by using identical reference numerals. A projector 85 and light detector 86 are disposed above and below a taking lens 10, opposing each other relative to the optical axis of the lens 10. The projector 85 has a plurality of (e.g., four in this embodiment) spot light sources 85a to 85d, each of which is constructed of an LED, for throwing a near infrared ray, and a lens, as well known in the art. The projector 85 throws four spot light beams at a photographic scene 87 which is represented schematically by a flat plane. Four spot light sources 85a to 85d are actuated sequentially to spot-scan laterally the center of the photographic scene 87 at a constant angular velocity.

The light detector 86 is constructed of a lens 93 and an image area sensor 94, and detects light reflected from a principal subject within the photographic scene 87. The distance to a principal subject is measured by means of an optical triangulation method, using the relationship between the incident position of a reflected light and a spot light source.

The taking lens 10 is moved in accordance with the subject distance by means of the lens setting mechanism 95, and is focussed on the principal subject from which the light was reflected. The position of the focussed principal subject on the photographic scene 87, i.e., the recorded position of the principal image on the frame 19a, is detected from the incident position of the reflected light on the image area sensor 94. The detected position information of the principal image is recorded in the form of a bar code by means of the bar code reading head 18, e.g., on the back of the photographic film 19.

Figure 9:
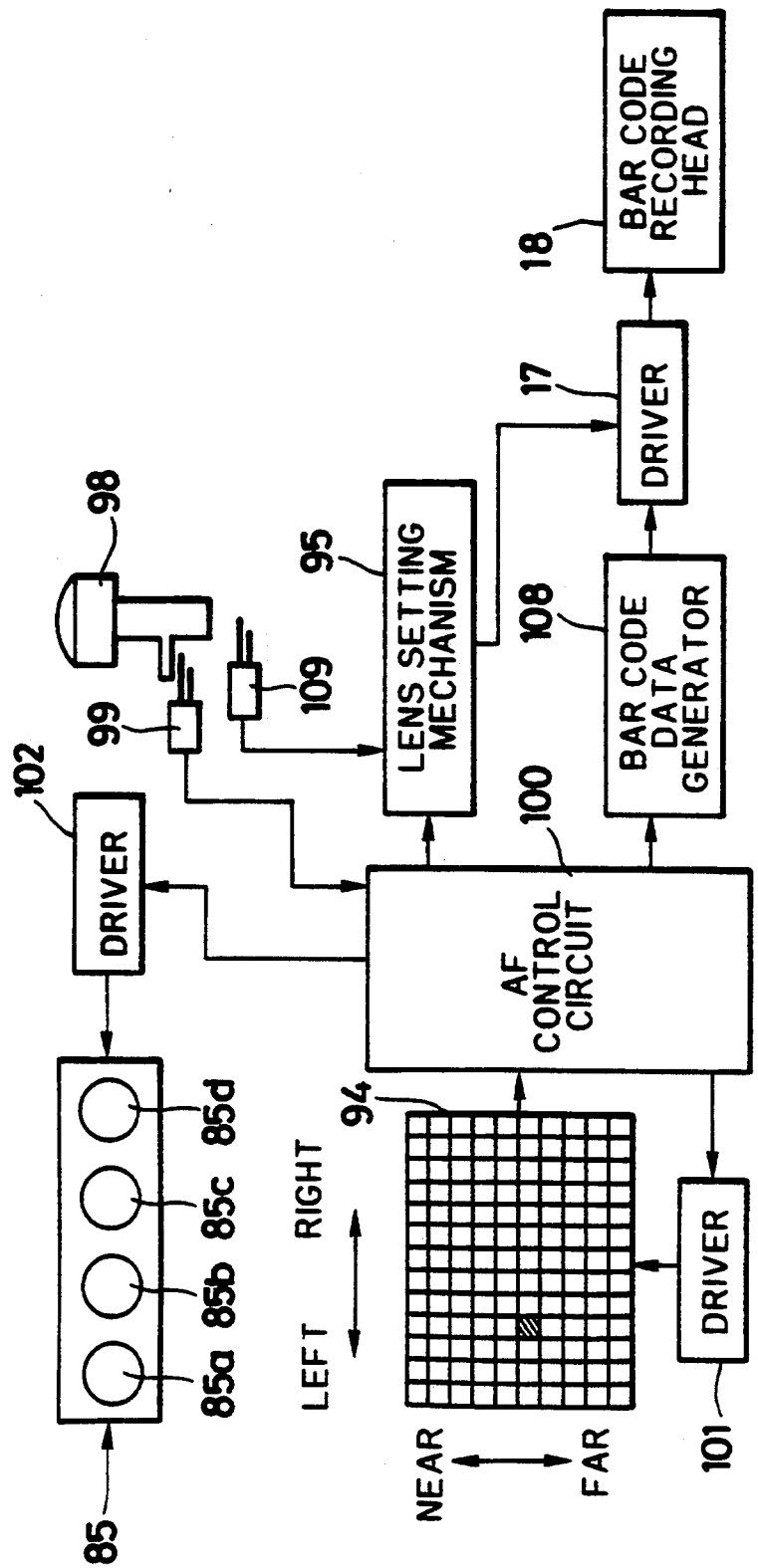
FIG. 9 is a block diagram showing the electrical construction of the photographic camera shown in FIG. 8.

As shown in FIG. 9, upon half-depression of a release button 98, a switch 99 is turned on to generate a signal which is sent to an autofocus (AF) control circuit 100. The AF control circuit 100 causes a driver 102 to actuate sequentially the spot light sources 85a to 85d which apply spot light beams toward the photographic scene 87. A light beam reflected from the principal subject becomes incident on the image area sensor 94 at the position indicated by hatched lines. The subject distance is obtained from the row number of the pixel of the image area sensor 94 on which the reflected light has become incident. The lateral position within the frame is obtained from the column number of the pixel. "NEAR" and "FAR" in FIG. 9 indicate subject distance, and "LEFT" and "RIGHT" indicate lateral position within the frame.

The image area sensor 94 is driven by a driver 101 at a predetermined period to read video signals therefrom. The video signals are supplied to the AF control circuit 100. In synchronism with this reading, the spot light sources are actuated sequentially. The AF control circuit 100 detects the pixel on which the reflected light is incident by checking the output level of video signals.

Figure 10:
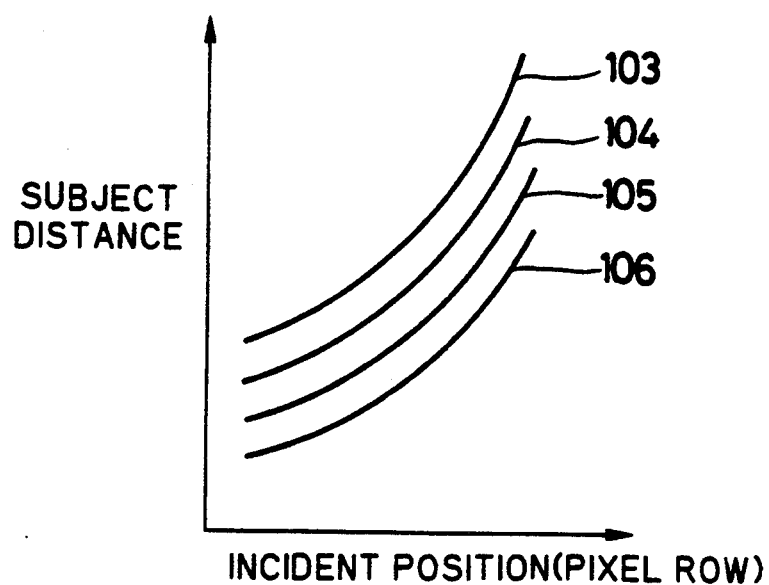
FIG. 10 is a graph showing the relationship between a light incident position of an image sensor and a subject distance.

Even if the detected pixel on which the reflected light is incident is the same, the subject distance might be different if the position of the spot light source is different. In view of this possibility, data as shown in FIG. 10 are stored in the AF control circuit 100 so that the subject distance can be identified from the position of the spot light source presently being illuminated, and the pixel row number. Curve 103 corresponds to the range finding operation by the spot light source 85a, and curve 106 to the range finding operation by the spot light source 85d.

The AF control circuit 100 determines lens setting position in accordance with detected subject distance, and sends the determined position to the lens setting mechanism 95. The position information obtained on the basis of the row number of the reflected light incident pixel is sent to the bar code data generator 108.

Upon full depression of the release button 98, a switch 109 is turned on so that the lens setting mechanism 95 is activated to set the taking lens 10 at a focussed position. After setting the taking lens 10, the shutter is activated to take the photographic scene 87 in the photographic film 19. Simultaneously with or slightly after this photographing, the position information of the principal subject is recorded on the photographic film 19.

If there are a plurality of subjects, the corresponding number of reflected lights are incident on pixels, and a plurality of subject distances are measured. In such a case, as proposed by a conventional multi-beam range finding scheme, a near distance priority, a frame central area priority, intermediate distance selection, or the like is used selectively. In the case of the near distance priority or frame central area priority, a subject with priority is regarded as the principal subject, and its position within the frame is recorded on a photographic film. In the case of the intermediate distance selection, all detected subjects are regarded as principal subjects, and their position information is recorded on photographic film.

If there is no principal subject, as in the case of a far distance photographic scene, obviously the position information of a principal subject is not recorded. If there is a principal subject at an relatively great distance, the image size of the principal subject within the frame is considerably small. In this case, a print exposure amount may be determined from the average photometric value of the frame, similarly to the case in which there is no principal subject. However, it becomes more convenient if the principal subject distance, as well as its position information, are recorded on a photographic film.

Figure 11:
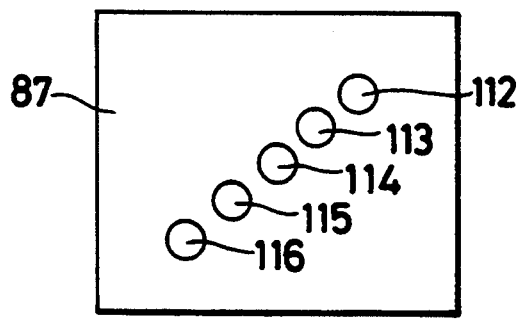
FIGS. 11 and 12 show schematically other embodiments of a method of throwing a spot light beam.
Figure 12:
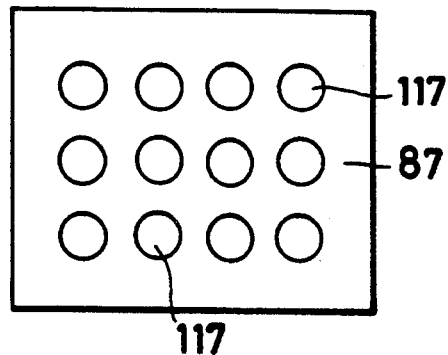
Figure 13:
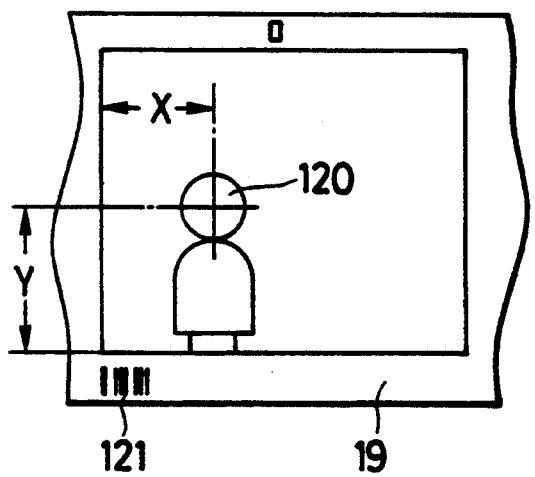
FIGS. 13 to 17 show examples of recorded position information.
Figure 14:
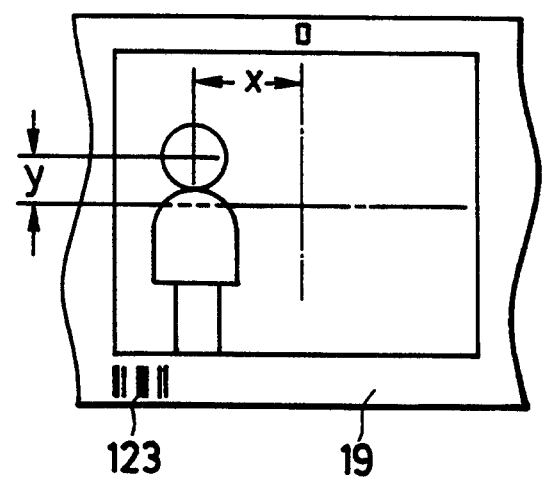
Figure 15:
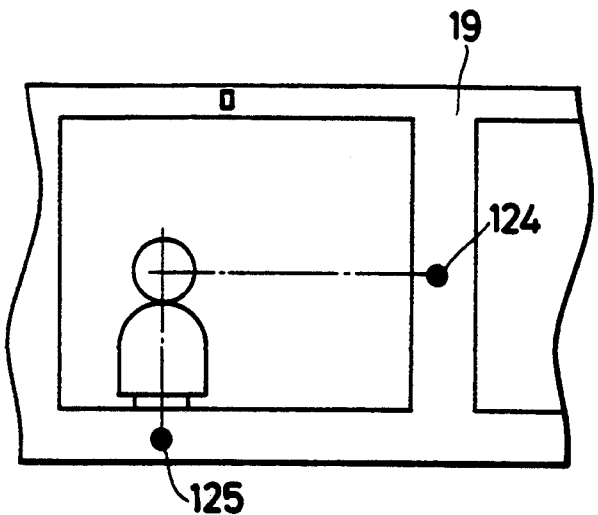

Spot light beams 112 to 116 may be applied sequentially, obliquely to the photographic scene 87 as shown in FIG. 11. A plurality of spot light beams 117 may be applied sequentially as shown in FIG. 12, by using a projector having spot light sources disposed in a matrix form.

FIGS. 13 to 17 show examples of recording the position information. In the embodiment shown in FIG. 13, the position information shows distances X and Y from the origin, at the lower left corner within the frame, to a principal image 120, those distances being recorded in a photographic film 19 as a bar code 121. In the embodiment shown in FIG. 14, distances x and y from the origin of the central point, within the frame, to a principal image are recorded as a bar code 123. In the embodiment shown in FIG. 15, two marks 124 and 125 are recorded at positions outside the frame, so that an intersection between two orthogonal lines passing these two marks 124 and 125 are used as the central position of a principal image.

Figure 16:
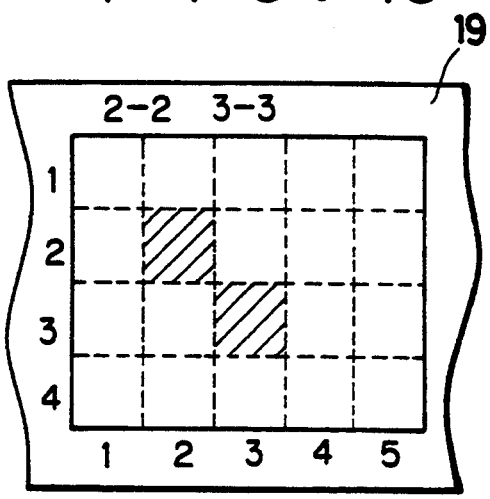
Figure 17:
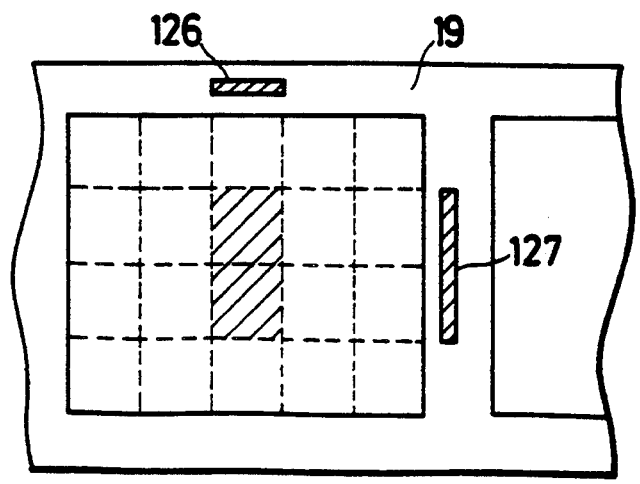

In the embodiments shown in FIGS. 16 and 17, a frame is divided into a plurality of areas, and the positions of the divisional areas within which a principal subject is present is recorded on a photographic film 19. Specifically, in the embodiment shown in FIG. 16, codes "2—2" and "3—3" of the principal subject areas are recorded on the photographic film 19. In the embodiment shown in FIG. 17, marks 126 and 127 are recorded at positions outside the frame, corresponding in length to the sides of the principal subject areas.

A photographic film 19 recorded with the position information is developed, and thereafter is set at the printing station. During the printing operation, the position information recorded for each frame is read with a sensor to identify the position of a principal subject within the frame. As is well known, each measurement point within the frame is subjected to three color separation photometry, and the obtained three color densities for respective measurement points are used in calculating a print exposure amount.

In this case, the print exposure amount for each color is determined in such a manner that the three color densities of the principal image are weighted to a large degree to obtain a finished principal subject having a proper density and color balance. The quality of a finished image can be improved further by using not only the position information of a principal subject but also other data. The other data which are recorded on a photographic film may include the type of illumination light source, the illumination condition (front light or rear light), a presence/absence of flashing, and the intensity ratio of three color components of photographing light.

FIG. 18 is a schematic diagram showing a photographic camera which records the position information of a range finding area and the distance information of a principal subject. Elements which are the same as those shown in FIG. 8 are represented by identical reference numerals. A projector unit 130 causes an infrared spot light to be thrown from a light source 131 for application to a photographic scene 87, and for sequential scanning of range finding areas 133 to 137. During this scanning, the infrared light reflected from a principal subject 138 becomes incident on an image sensor 94 via a lens 93.

An X-shaft 140 is mounted on the light source 131, which in turn is rotatably mounted on a holder 141 on which a Y-shaft 142 is fixedly coupled. The X-shaft 140 is coupled to an X-direction scanning unit 143 whose pulse motor (not shown) causes the light source 131 to swing in the directions indicated by a bidirectional arrow. The Y-shaft 142 is coupled to a Y-direction scanning unit 144, which swings the light source 131 in the directions indicated by another bidirectional arrow.

A controller 145 controls the X- and Y-direction scanning units 143, 144 to scan the light source 131 two-dimensionally. The controller 145 operates to allow the light source 131 to illuminate only while it scans the range finding areas 133 to 137. The X- and Y-direction scanning units 143, 144 each has an encoder. A position signal from the encoder is supplied to a position/distance detecting unit 146. This detecting unit 146 operates in such a manner that the reflected light incident position of the image sensor 94 is obtained from the level of video signals.

The position of the range finding area and the distance to the principal subject 138 are detected in accordance with the incident position and the position signal of a range finding area within which a principal subject 138 is present. The obtained range finding area position information and principal subject distance information are sent to a bar code data generator 108. The distance information output from the detecting unit 146 also is sent to a lens setting mechanism 95.

Figure 19:
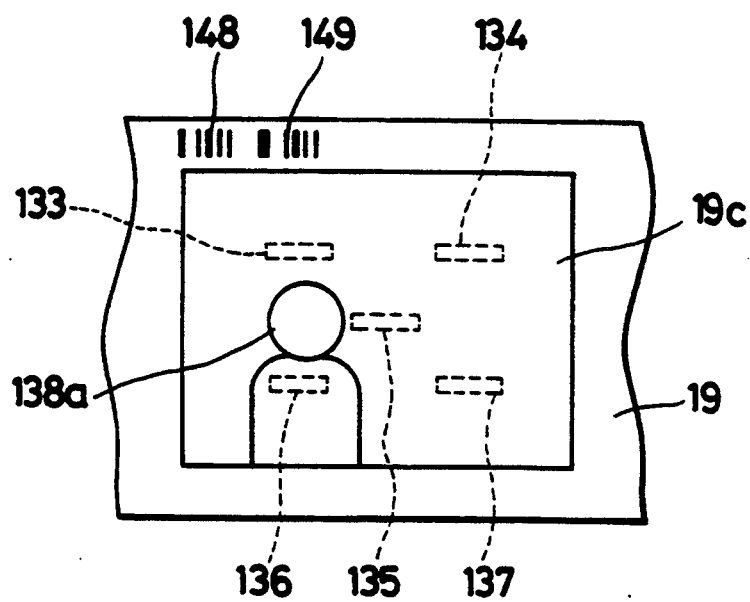
FIG. 19 is a schematic view showing a photographic film with an image photographed with the photographic camera shown in FIG. 18.

FIG. 19 shows an example of a developed photographic film. For convenience of description, the range finding areas 133 to 137 are represented by broken line rectangles. An image 138a of a principal subject 138 is recorded in the frame 19c of a photographic film 19. The range finding area information 148 and distance information 149 are recorded outside the frame 19c, the range finding area information 148 being used for discriminating the range finding area at which the distance to the principal subject 138 has been measured. In this embodiment, the principal subject 138 is positioned at the range finding area 136, and the information on the central point of a range finding area is used as the range finding area information.

Figure 20:
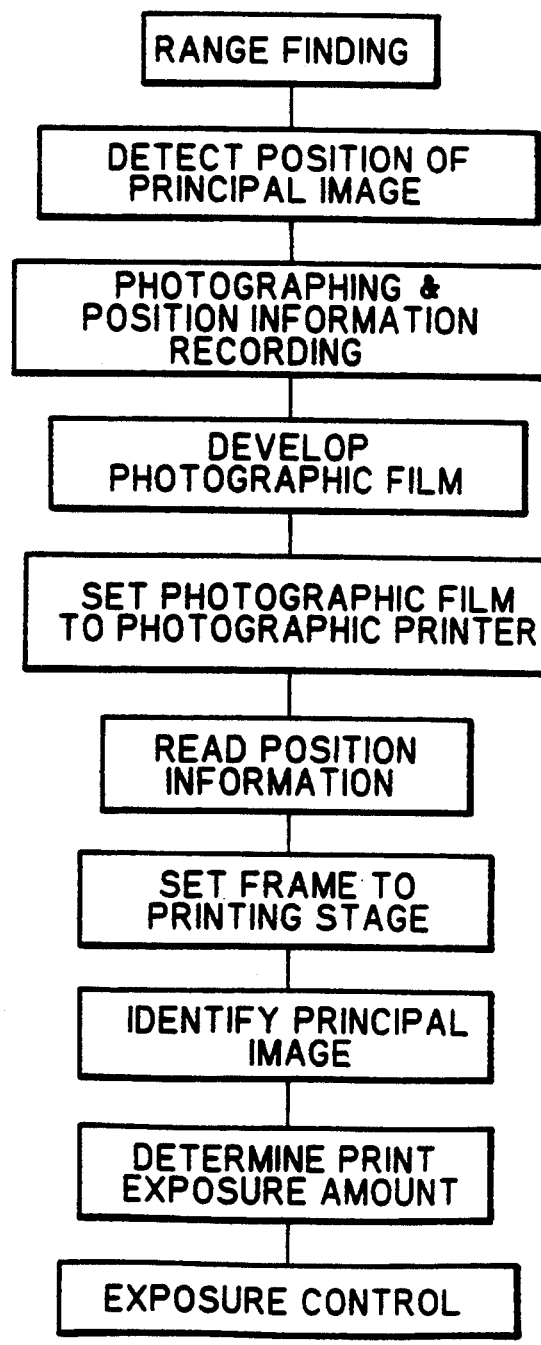
FIG. 20 is a flow chart illustrating a procedure starting from photographing to printing.

Next, photographing an image with the photographic camera shown in FIG. 18 and printing a frame within the photographic film shown in FIG. 19 will be described with reference to the flow charts shown in FIGS. 20 and 21. In the range finding operation, the controller 145 actuates the Y-direction scanning unit 144 to rotate the holder 141 by means of the Y-shaft 142. The holder 141 causes the light source 131 to rotate in the Y-direction (horizontal direction). During the predetermined period of this rotation, the light source 131 emits an infrared light which scans the range finding area 133, and next the range finding area 134. After scanning the range finding area 134, the light source 131, together with the holder 141, rotates reversely to restore the initial position with respect to the Y-direction.

Upon restoration of the initial position by the light source 131, the controller 145 actuates the X-direction scanning unit 143 to rotate the X-shaft 142 in the clockwise direction by a predetermined angle. Immediately thereafter, the controller 145 actuates the Y-direction scanning unit 144 to rotate the light source 131 in the Y-direction. During the predetermined period of this rotation, the light source 131 emits an infrared light to scan the range finding area 135. In a similar manner, the range finding areas 136 and 137 are scanned sequentially.

Since it is assumed that the principal subject 138 is present within the range finding area 136, the infrared light reflected by the subject 138 becomes incident on the image sensor 94 via the lens 93. Video signals read from the image sensor 94 are sent to the detecting unit 146 to detect the reflected light incident position. Since the position signal of the light source 132 also is supplied to the detecting unit 146, the range finding area now concerned can be discriminated. On the basis of the range finding area and the reflected light incident position, the range finding area 136 of the principal subject 138 and the distance thereto are detected. The obtained position information, including range finding area and principal subject distance information, are sent to the bar code data generator 108, the distance information also being sent to the lens setting mechanism 95.

If a principal subject is detected at a plurality of the range finding areas, the corresponding pieces of position information of these range finding areas are recorded on the photographic film. If a plurality of principal subjects are located at different distances, these subjects are detected at the respective range finding areas. The distance for use in determining a print exposure amount is determined in accordance with schemes of a near distance priority, intermediate distance selection, or the like. If a subject is present at the range finding areas 136 and 137 and another subject at the farther distance is present, e.g., at the range finding area 135, then the subject at the range finding areas 136 and 137 is, in many cases, the earth or a table, and it is better to neglect the distance information on these range finding areas.

Upon full depression of the release button after the range finding operation, as described previously, the shutter 25 is actuated after setting the taking lens, so as to take a photographic scene 87 in the photographic film 19. Simultaneously with or immediately after this photographing, the bar code recording head 18 is actuated to record the position information 148 of the range finding area and the distance information 149 on the photographic film 19.

The developed photographic film 19 is sent to the photographic printer shown in FIG. 3, and the position information 148 and distance information 149 recorded for the frame 19c to be printed are read. The frame 19c is subjected to photometry when set at the printing station. Next, a principal subject image area 152 is determined on the basis of the position information 148 and distance information 149, as shown in FIG. 22. In the embodiment shown in FIG. 22, the center of the principal subject image area 152 is coincident with a center point (CP) on the frame 19c, a position corresponding to the center of the range finding area 136. The size of the principal subject image area 152 is 2A×2B, where A is the component of the position CP in the Y-direction (horizontal direction) and B is the component of the position CP in the X-direction (vertical direction). The lengths A and B are obtained from the following equations:

$$A = A_0 \cdot f/(L-f)$$

$$B = B_0 \cdot f/(L-f)$$

where $S_0$ is half the width of the ordinary human figure, $B_0$ is half the height of the ordinary human figure, L is a subject distance, and f is the focal length of a taking lens.

Characteristic values of the principal subject image are derived from the determined principal subject image area 152. By using the characteristic values, the print exposure amount is calculated for each of red, green, and blue colors.

Figure 21:
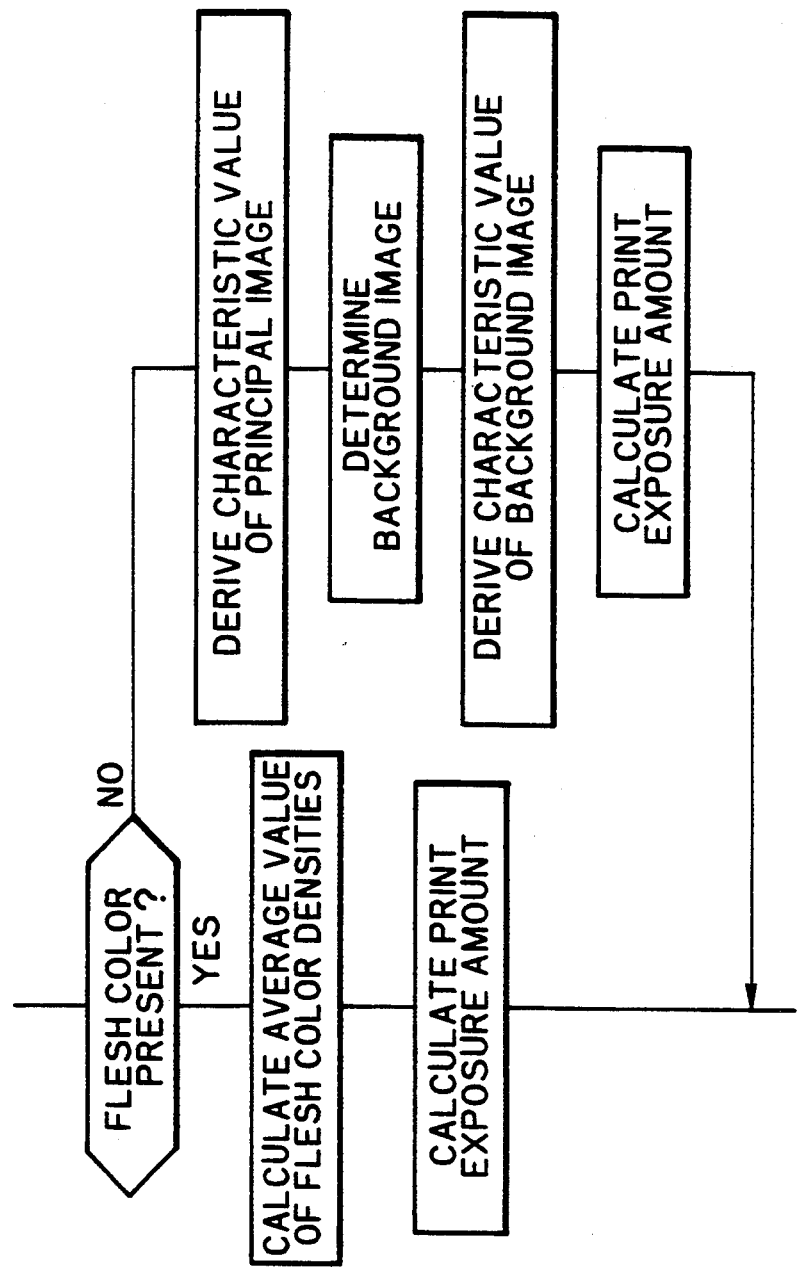
FIG. 21 is a flow chart illustrating a procedure for calculating a print exposure amount.

FIG. 21 is a flow chart showing an example of calculation of a print exposure amount. Referring to the data, stored in a memory, which define the range of flesh color, it is judged whether each measurement point within the principal subject image area 152 is a flesh color. If there are flesh color measurement points, the principal subject image is judged to be a figure. The average value of densities at the derived flesh color measurement points is calculated to determine a print exposure amount. The detail of calculating a print exposure amount on the basis of flesh color control is described, e.g., in U.S. Pat. No. 4,816,874 issued Mar. 28, 1989 (corresponding to Japanese Patent Laid-open Publication No. 63-178222), and other publications.

If there is no flesh color point within the principal subject image area 152, or if the number of flesh color points is smaller than a predetermined value, the principal subject is judged to be a landscape, flowers or the like. In this case, an average density $Dm_i$ (i stands for one of red, green, and blue colors) is calculated from the densities of pixels within the principal subject image area 152. The maximum and minimum densities $Dmx_i$ and $Dmn_i$ also are derived from the densities of pixels within the principal subject image area 152. Next, an average density $Db_i$ for the background image area is calculated. These characteristic values are substituted into the following calculation equation of the principal subject image emphasizing exposure control type to calculate the density $D_i$:

$$D_i = K1 \cdot Dm_i + K2 \cdot Db_i + K3 \cdot Dmx_i + K4 \cdot Dmn_i \qquad (1)$$

where K1-K4 are coefficients.

The obtained density $D_i$ is substituted into the following calculation equation (2) to obtain a print exposure amount $E_i$. This print exposure amount $E_i$ is converted into a filter setting position by referring to the table data indicating the relationship between the print exposure amount and filter setting position:

$$\log E_i = \alpha_i (D_i - DN_i) + \beta_i \qquad (2)$$

where $\alpha$ is a slope coefficient, $\beta$ is a constant determined by a combination of a photographic film, color paper, taking lens and the like, and DN is an average density of a control negative film.

In the foregoing embodiments, the size of a principal subject image area is determined in accordance with a subject distance so as to make the size equal to the figure size on the frame. Instead, irrespective of a subject distance, the frame may be divided into a plurality of frame divisional areas in correspondence with range finding areas. An example of this is shown in FIG. 23. If a primary subject is present at the range finding area 133, the frame divisional area S1 is used as the principal subject image area. Similarly, the frame divisional area S2 corresponds to the range finding area 134, and the frame divisional area S3 to the range finding area 135.

Figure 24A:
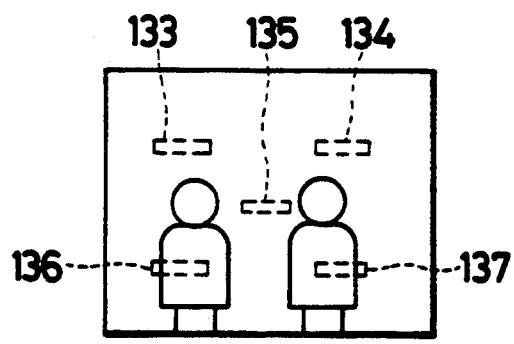
Figure 24B:
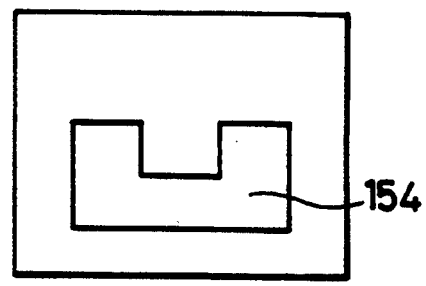
Figure 25A:
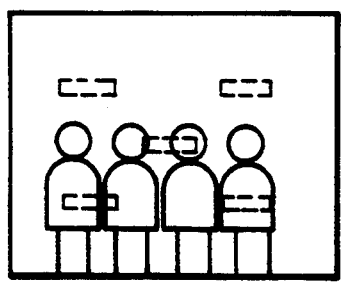
Figure 25B:
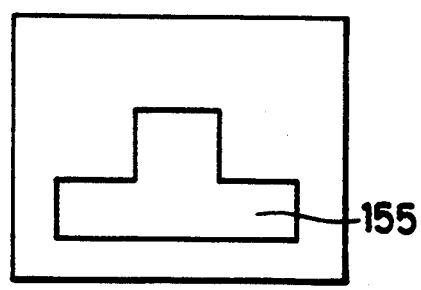
Figure 26A:
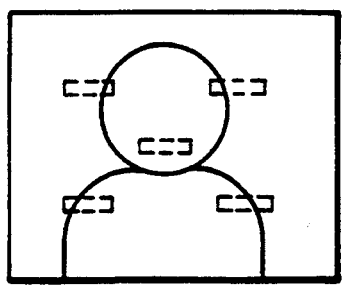
Figure 26B:
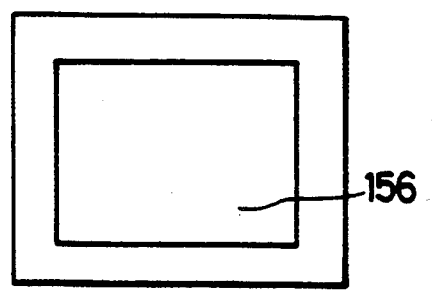

As shown in FIG. 24A, for the scene where two principal subjects are present on the range finding areas 136 and 137 within the frame, the area inclusive of the frame divisional areas S4 and S5 is used as a principal subject image area 154, as shown in FIG. 24B. For the scene shown in FIG. 25A, the area inclusive of the frame divisional areas S3, S4 and S5 is used as a principal subject image area 155, as shown in FIG. 25B. For the scene as shown in FIG. 26A, an area inclusive of the frame divisional areas S1 to S5 is used as a principal subject image area 156 as shown in FIG. 26B.

In this embodiment, if a scene is judged not to be a figure scene, the scene other than the principal subject image area is judged to be the background image area, and its average density is used as the background image characteristic value. Instead, average densities at frame divisional areas within the background image area may be weighted to calculate the density $D_i$. For example, for the case where the frame divisional area S5 is judged to be the principal subject image area, the density $D_i$ is calculated by the following equation:

$$D_i = C1 \cdot D1_i + C2 \cdot D2_i + C3 \cdot D3_i + C4 \cdot D4_i + C5 \cdot D5_i$$

where C is a coefficient, D1 an average density of the frame divisional area S1, D2 an average density of the frame divisional area S2, D3 an average density of the frame divisional area S3, D4 an average density of the frame divisional area S4, and D5 an average density of the frame divisional area S5.

The above-described embodiments have been directed to density correction. The invention also is applicable to color correction. Instead of recording the position information of a range finding area on a photographic film, it may be recorded in an IC card, a magnetic recording area formed at the periphery of a film patrone, or a recording medium connected to the photographic film. This invention also is applicable to printing an image recorded with an electronic still camera. In the case of an electronic still camera, the position information together with the image data are written in a magnetic floppy disk. In printing the image on a color paper by using a digital color printer while displaying it on a CRT for example, the stored position information is read, and the exposure amount is controlled by using the image data.

Further, a photometric unit for carrying out divisional photometry of a photographic scene may be mounted on a camera, and the photometric values at divisional areas may be weighted according to the position of the principal subject, and added together to obtain a subject brightness which is used for the exposure control. Since a contrast between a detected principal subject and the background can be checked, the present invention also is applicable to automatic tone control of a digital color printer. Furthermore, the type of a principal subject can be presumed such that, if flesh color points are included in the principal subject image area, then the principal subject is judged to be a figure, and that, if grey points are included, then it is judged to be a landscape, or flowers and grass. Therefore, this invention is applicable to automatic edge emphasis control of a digital color printer.

The range finding unit used with the above embodiments is of an active type that a spot light is applied to a subject for the range finding. Other range finding units, such as a passive type using two sensors, wherein two images on the sensors are compared to each other, an ultrasonic type, and the like may also be used.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A method of detecting a principal subject image within a frame recorded on a recording medium in a means for making a hard copy of said frame, said means for making including a means for reading data and means for scanning said frame, said method comprising the steps of:

reading two-dimensional position information recorded when taking a frame image, said two-dimensional position information representing part of an area of said principal subject image;

determining said area of said principal subject image in accordance with said two-dimensional position information;

deriving a characteristic value to be used for the exposure control from within said area of said principal subject image; and determining a print exposure amount in accordance with said characteristic value when printing said frame on a photosensitive material.

2. A method according to claim 1, wherein said area of said principal subject image is determined in accordance with a focal length of a taking lens, a distance between said principal subject and said taking lens, and the physical dimensions of a reference figure.

3. A method according to claim 1, wherein said frame comprises a plurality of frame divisional areas, and said two-dimensional position information identifies among said frame divisional areas a frame divisional area where said principal subject image is present.

* * * * *